(12) United States Patent
Collins et al.

(10) Patent No.: US 12,480,262 B1
(45) Date of Patent: Nov. 25, 2025

(54) NON-PERFORATED ARTIFICIAL TURF WITH POROUS BACKING AND METHODS OF MANUFACTURE THEREOF

(71) Applicant: Sprinturf, LLC, Daniel Island, SC (US)

(72) Inventors: Jamie Randall Collins, Chatsworth, GA (US); Timothy Bryan Wagoner, Dalton, GA (US)

(73) Assignee: SPRINTURF, LLC, Atlanta, GA (US)

( * ) Notice: Subject to any disclaimer, the term of this patent is extended or adjusted under 35 U.S.C. 154(b) by 0 days.

(21) Appl. No.: 18/181,110

(22) Filed: Mar. 9, 2023

Related U.S. Application Data (60) Continuation of application No. 16/719,373, filed on Dec. 18, 2019, now Pat. No. 11,624,159, which is a division of application No. 15/400,139, filed on Jan. 6, 2017, now abandoned.

(60) Provisional application No. 62/276,488, filed on Jan. 8, 2016.

(51) Int. Cl.
| | |
|---|---|
| *E01C 13/08* | (2006.01) |
| *B05D 1/40* | (2006.01) |
| *B05D 3/02* | (2006.01) |
| *B05D 5/04* | (2006.01) |
| *B05D 7/26* | (2006.01) |
| *B29C 44/32* | (2006.01) |

(Continued)

(52) U.S. Cl.
CPC ............... *E01C 13/08* (2013.01); *B05D 1/40* (2013.01); *B05D 3/0272* (2013.01); *B05D 5/04* (2013.01); *B05D 7/26* (2013.01); *B29C 44/32* (2013.01); *B32B 5/18* (2013.01); *B32B 38/0032* (2013.01); *B05D 2503/00* (2013.01); *B32B 2038/0084* (2013.01); *E01C 2201/20* (2013.01)

(58) Field of Classification Search
CPC ............... E01C 13/08; E01C 2201/20; D06N 2203/068; D06N 2205/04; D06N 2209/126; D06N 7/0071–0073; D06N 3/0043–0052; D10B 2505/202; Y10T 428/23979

See application file for complete search history.

(56) References Cited

U.S. PATENT DOCUMENTS

| | | | |
|---|---|---|---|
| 3,281,258 A | 10/1966 | Callahan | |
| 4,426,415 A * | 1/1984 | Avery | ................. D06N 7/0068 428/17 |
| 4,515,839 A | 5/1985 | Broaddus et al. | |

(Continued)

FOREIGN PATENT DOCUMENTS

| | | | |
|---|---|---|---|
| EP | 1967651 A1 | 9/2008 | |
| JP | H10152809 A | 6/1998 | |
| WO | WO-9309293 A1 * | 5/1993 | ............. D04H 1/559 |

OTHER PUBLICATIONS

JP 10-152809, JPO translation, 1998.*

*Primary Examiner* — Larissa Rowe Emrich
(74) *Attorney, Agent, or Firm* — McAndrews, Held & Malloy, Ltd.

(57) ABSTRACT

A method for manufacturing a synthetic non-perforated drainable material is disclosed herein. Generally, the method includes injecting a coating material with air, applying the air-injected coating material to the first side of the material, and curing the air-injected material such that it adheres. Once cured, the material has a highly efficient drainage rate that remains consistent throughout the life of the material.

16 Claims, 5 Drawing Sheets

EXEMPLARY SIMPLIFIED SIDE VIEW – ARTIFICAL TURF (51) Int. Cl.
*B32B 5/18* (2006.01)
*B32B 38/00* (2006.01)

(56) References Cited

U.S. PATENT DOCUMENTS

| | | |
|---|---|---|
| 4,572,700 A | 2/1986 | Mantarro et al. |
| 4,781,781 A | 11/1988 | Hallworth |
| 4,897,302 A | 1/1990 | Bull |
| 4,946,719 A | 8/1990 | Dempsey |
| 5,851,625 A | 12/1998 | Smesny et al. |
| 7,364,634 B1 | 4/2008 | Irwin, Sr. |
| 7,858,148 B2 | 12/2010 | Reddick |
| 8,236,392 B2 | 8/2012 | Sawyer et al. |
| 8,263,203 B2 | 9/2012 | Reddick |
| 8,647,452 B2 | 2/2014 | Bearden et al. |
| 8,968,502 B1 | 3/2015 | Bearden et al. |
| 2002/0172772 A1 | 11/2002 | Robbins |
| 2003/0108677 A1 | 6/2003 | Robbins |
| 2003/0134081 A1 | 7/2003 | Holeschovsky et al. |
| 2004/0156992 A1 | 8/2004 | Robbins |
| 2005/0281977 A1 | 12/2005 | Mashburn |
| 2006/0165951 A1 | 7/2006 | Holeschovsky et al. |
| 2008/0317997 A1 | 12/2008 | Wright |
| 2009/0062432 A1 | 3/2009 | Doesburg et al. |
| 2009/0081406 A1 | 3/2009 | Higgins et al. |
| 2010/0055461 A1 | 3/2010 | Daluise et al. |
| 2010/0129571 A1 | 5/2010 | Bearden et al. |
| 2011/0183086 A1 | 7/2011 | Reddick |
| 2012/0211004 A1 | 8/2012 | Goldman et al. |
| 2014/0134387 A1 | 5/2014 | Yamada et al. |
| 2015/0044395 A1 | 2/2015 | Reddick |
| 2016/0074886 A1 | 3/2016 | Gantenbein et al. |
| 2021/0002832 A1 | 1/2021 | Brown |

\* cited by examiner

FIG. 1A: EXEMPLARY SIMPLIFIED SIDE VIEW – ARTIFICAL TURF

FIG. 1B: EXEMPLARY DETAILED SIDE VIEW – ARTIFICAL TURF

FIG 2: EXEMPLARY BOTTOM VIEW – ARTIFICIAL TURF

FIG 3: EXEMPLARY EXPLODED VIEW – ARTIFICIAL TURF

FIG 4: EXEMPLARY ARTIFICIAL TURF MANUFACTURING PROCESS

NON-PERFORATED ARTIFICIAL TURF WITH POROUS BACKING AND METHODS OF MANUFACTURE THEREOF

CROSS REFERENCE TO RELATED APPLICATIONS

This application is a continuation of U.S. patent application Ser. No. 16/719,373, filed Dec. 18, 2019, and entitled "NON-PERFORATED ARTIFICIAL TURF WITH POROUS BACKING AND METHODS OF MANUFACTURE THEREOF," which is a divisional of U.S. application Ser. No. 15/400,139, filed Jan. 6, 2017, and entitled "NON-PERFORATED ARTIFICIAL TURF WITH POROUS BACKING AND METHODS OF MANUFACTURE THEREOF," which claims priority to, and the benefit under 35 U.S.C. § 119 of U.S. Provisional Patent Application No. 62/276,488, filed Jan. 8, 2016, and entitled "NON-PERFORATED ARTIFICIAL TURF WITH POROUS BACKING AND METHODS OF MANUFACTURE THEREOF," the disclosures of which are incorporated herein by reference in their entireties.

TECHNICAL FIELD

The present disclosure relates generally to a non-perforated synthetic turf system with porous backing and, more particularly, to a synthetic turf system with vertical grass blades tufted into a non-perforated, porous, vertically-draining backing that may or may not be infilled with sand or a blend of sand/resilient particles.

BACKGROUND

Synthetic turf systems (e.g., artificial grass) generally comprise multiple layers that are held together by a nonporous backing (e.g., urethane, polyurethane, etc.) and, when installed, are covered with one or more layers of infill materials (e.g., sand, rubber, resilient particles, etc.) that stabilize the turf systems. Generally, those turf systems require large drainage holes in the backing to permit adequate drainage of liquids through the turf system. Over time, these drainage holes can become clogged with particles of the infill material that have migrated to the bottom of the turf system, thereby reducing the drainage rate of the turf system.

Therefore, there is a long-felt but unresolved need for a highly efficient synthetic turf system with a drainage rate that will remain consistent throughout the life of the turf system.

BRIEF SUMMARY OF THE DISCLOSURE

Briefly described, and according to one embodiment, aspects of the present disclosure generally relate to a synthetic turf system with vertical grass blades tufted into a non-perforated, porous, vertically-draining backing that may or may not be infilled with sand or a blend of sand/resilient particles and methods of manufacturing the same.

As disclosed herein, one non-limiting embodiment of the present disclosure comprises an artificial turf that provides a non-perforated drainage system for synthetic grass systems. Generally, the artificial turf comprises a pile fabric having a backing and a multiplicity of generally upstanding pile elements, wherein the bottom of the backing and the portion of the generally upstanding pile elements extending therethrough are coated with an air-injected material (e.g., urethane, etc.). In various embodiments, the artificial turf may be installed with an infill that is interspersed between the upstanding pile elements.

In one embodiment, the air-injected coating material placed on the turf (e.g., lowermost when the turf is in use) binds the fibers to the backing and permits adequate drainage. Generally, these synthetic grass systems do not require punctured holes through the backing (as would the prior art) because the air-injected coating material is a high-viscosity compound, which provides exceptional drainage capacity. In one embodiment, the air bubbles create small passages through the coating when cured that permit drainage. In an alternative embodiment, the air bubbles within the coating generally converge on the generally upstanding pile elements as they pass through the backing, thereby creating passageways concentric with the tufting holes for the generally upstanding pile elements that permit drainage. In an alternative embodiment, the air-injected coating does not coat the backing underneath the pile overlays formed by the generally upstanding pile elements as they pass over the backing between the tufting holes thereby permitting drainage underneath the pile overlays.

In various embodiments, the air-injected coating alters the manufacturing process of artificial turf. Before applying this coating to the turf, the coating is injected with air, which creates passages in the compound once it is applied that allow for free flow drainage. Then, the air-injected coating is quickly cured so that the passages remain in the coating.

In one embodiment, an artificial turf, comprising: a backing comprising a first side and a second side; a plurality of generally upstanding synthetic grass blades, wherein the plurality of generally upstanding synthetic grass blades extend across the first side to form a plurality of pile overlays, extend through the backing, and terminate outside the backing proximate the second side; and an air-injected coating that coats the first side of the backing and the plurality of pile overlays to bind together the backing and the plurality of generally upstanding synthetic grass blades.

In one embodiment, a method of manufacturing an artificial turf with a backing comprising a first side and a second side and a plurality of generally upstanding synthetic grass blades extending across the first side to form a plurality of pile overlays, extending through the backing, and terminating outside the backing proximate the second side, comprising the steps of: injecting a coating material with air; applying the air-injected coating material to the first side and the plurality of pile overlays; and curing the coating material so that it adheres to the lower surface of the artificial turf, wherein the cured coating material binds together the backing and the plurality of generally upstanding synthetic grass blades.

According to one aspect of the present disclosure, the artificial turf, wherein the air-injected coating uniformly coats the first side of the backing and the plurality of pile overlays. Furthermore, the artificial turf, wherein the air-injected coating comprises a thickness that permits the flow of liquids through the artificial turf. Moreover, the artificial turf, wherein the flow of liquids through at least 86 square inches of the artificial turf exceeds 80 inches per hour. Moreover, the artificial turf, wherein the flow of liquids through at least 86 square inches of the artificial turf exceeds 55 inches per hour. Further, the artificial turf, further comprising a layer of infill particles resting on the second side between the plurality of generally upstanding synthetic grass blades. Additionally, the artificial turf, wherein the air-injected coating comprises a thickness that permits the flow of liquids through the artificial turf.

According to one aspect of the present disclosure, the artificial turf, wherein the flow of liquids through at least 86 square inches of the artificial turf exceeds 140 inches per hour. Also, the artificial turf, wherein the flow of liquids through at least 86 square inches of the artificial turf exceeds 105 inches per hour. Also, the artificial turf, wherein the flow of liquids through at least 86 square inches of the artificial turf exceeds 80 inches per hour. Also, the artificial turf, wherein the air-injected coating comprises a thickness that binds together the backing and the plurality of generally upstanding synthetic grass blades with an average tuft bind strength that exceeds 8 pounds per force. Furthermore, the artificial turf, wherein the air-injected coating comprises a thickness that binds together the backing and the plurality of generally upstanding synthetic grass blades with an average tuft bind strength that exceeds 6.5 pounds per force. Furthermore, the artificial turf, wherein the air-injected coating comprises urethane. Moreover, the artificial turf, wherein the backing comprises a plurality of layers.

According to one aspect of the present disclosure, the method, wherein applying the coating material further comprises the steps of: pouring the coating material onto a portion of the first side; and spreading the coating material from the portion of the first side so that it is a generally uniform thickness across the entirety of the first side. Further, the method, wherein the generally uniform thickness permits the flow of liquids through the artificial turf. Additionally, the method, wherein the flow of liquids through at least 86 square inches of the artificial turf exceeds 80 inches per hour. Additionally, the method, wherein the flow of liquids through at least 86 square inches of the artificial turf exceeds 55 inches per hour.

According to one aspect of the present disclosure, the method, wherein the generally uniform thickness binds together the backing and the plurality of generally upstanding synthetic grass blades with an average tuft bind strength that exceeds 8 pounds per force. Also, the method, wherein the generally uniform thickness binds together the backing and the plurality of generally upstanding synthetic grass blades with an average tuft bind strength that exceeds 6.5 pounds per force. Also, the method, wherein curing the coating material further comprises curing the coating material within a steam heat oven at a temperature between 150° F. and 300° F. Furthermore, the method, wherein injecting the coating material with air further comprises injecting the coating material with air at a pressure between 100 psi and 150 psi. Moreover, the method, wherein the coating material comprises urethane.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 (consisting of FIGS. 1A and 1B) illustrates a side view of a synthetic grass system, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to a synthetic turf system with vertical grass blades tufted into a non-perforated, porous, vertically-draining backing that may or may not be infilled with sand or a blend of sand/resilient particles and methods of manufacturing the same.

As disclosed herein, one non-limiting embodiment of the present disclosure comprises an artificial turf that provides a non-perforated drainage system for synthetic grass systems. Generally, the artificial turf comprises a pile fabric having a backing and a multiplicity of generally upstanding pile elements, wherein the bottom of the backing and the portion of the generally upstanding pile elements extending therethrough are coated with an air-injected material (e.g., urethane, etc.). In various embodiments, the artificial turf may be installed with an infill that is interspersed between the upstanding pile elements.

In one embodiment, the air-injected coating material placed on the turf (e.g., lowermost when the turf is in use) binds the fibers to the backing and permits adequate drainage. Generally, these synthetic grass systems do not require punctured holes through the backing (as would the prior art) because the air-injected coating material is a high-viscosity compound, which provides exceptional drainage capacity. In one embodiment, the air bubbles create small passages through the coating when cured that permit drainage. In an alternative embodiment, the air bubbles within the coating generally converge on the generally upstanding pile elements where they pass through the backing, thereby creating passageways concentric with the tufting holes for the generally upstanding pile elements that permit drainage. In an alternative embodiment, the air-injected coating does not coat the backing underneath the pile overlays formed by the generally upstanding pile elements where they pass over the backing between the tufting holes thereby permitting drainage underneath the pile overlays.

In various embodiments, the air-injected coating alters the manufacturing process of artificial turf. Before applying this coating to the turf, the coating is injected with air, which creates passages in the compound once it is applied that allow for free flow drainage. Then, the air-injected coating is quickly cured so that the passages remain in the coating.

EXEMPLARY EMBODIMENTS

Figure 1A:
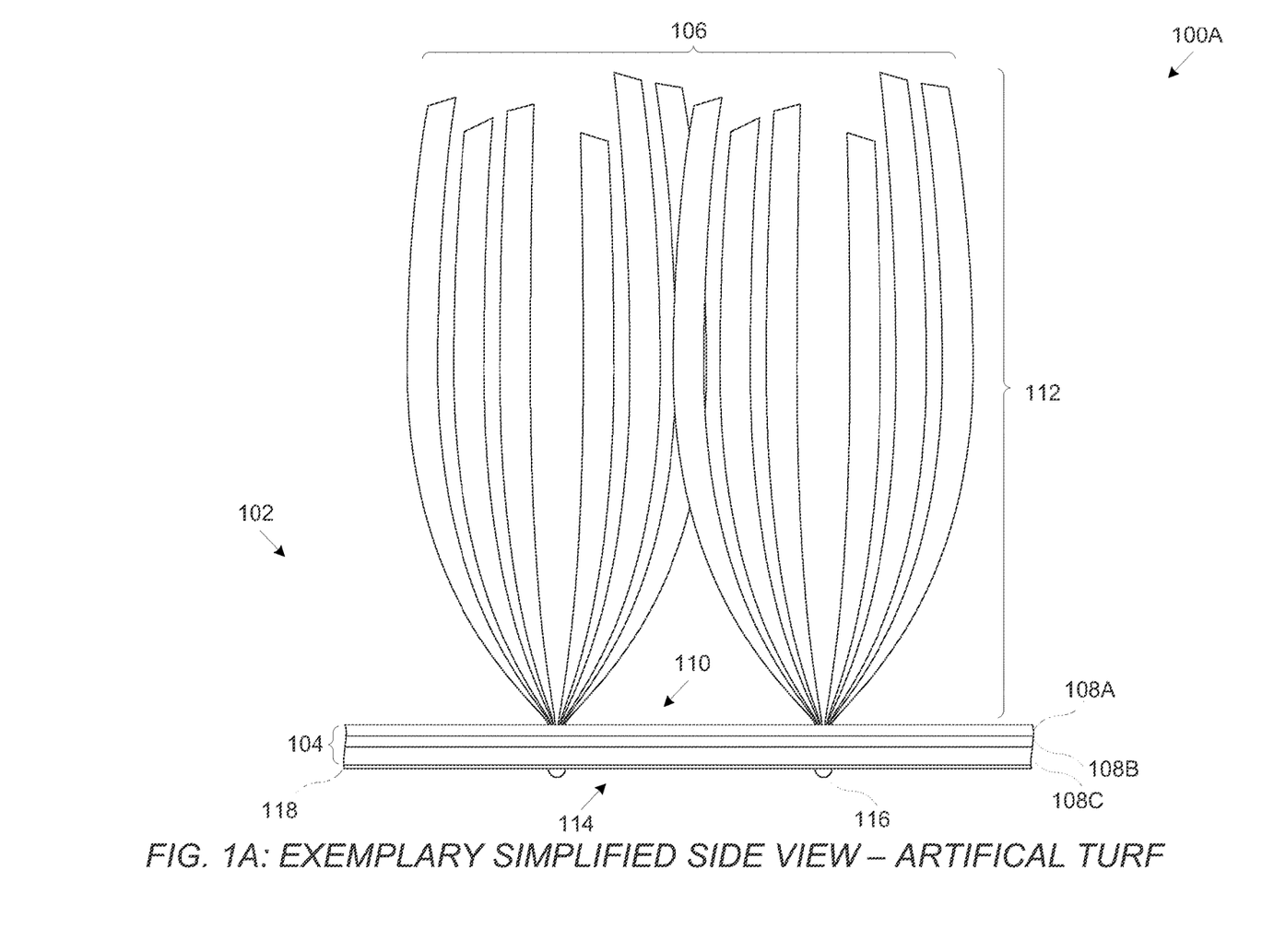
Figure 1B:
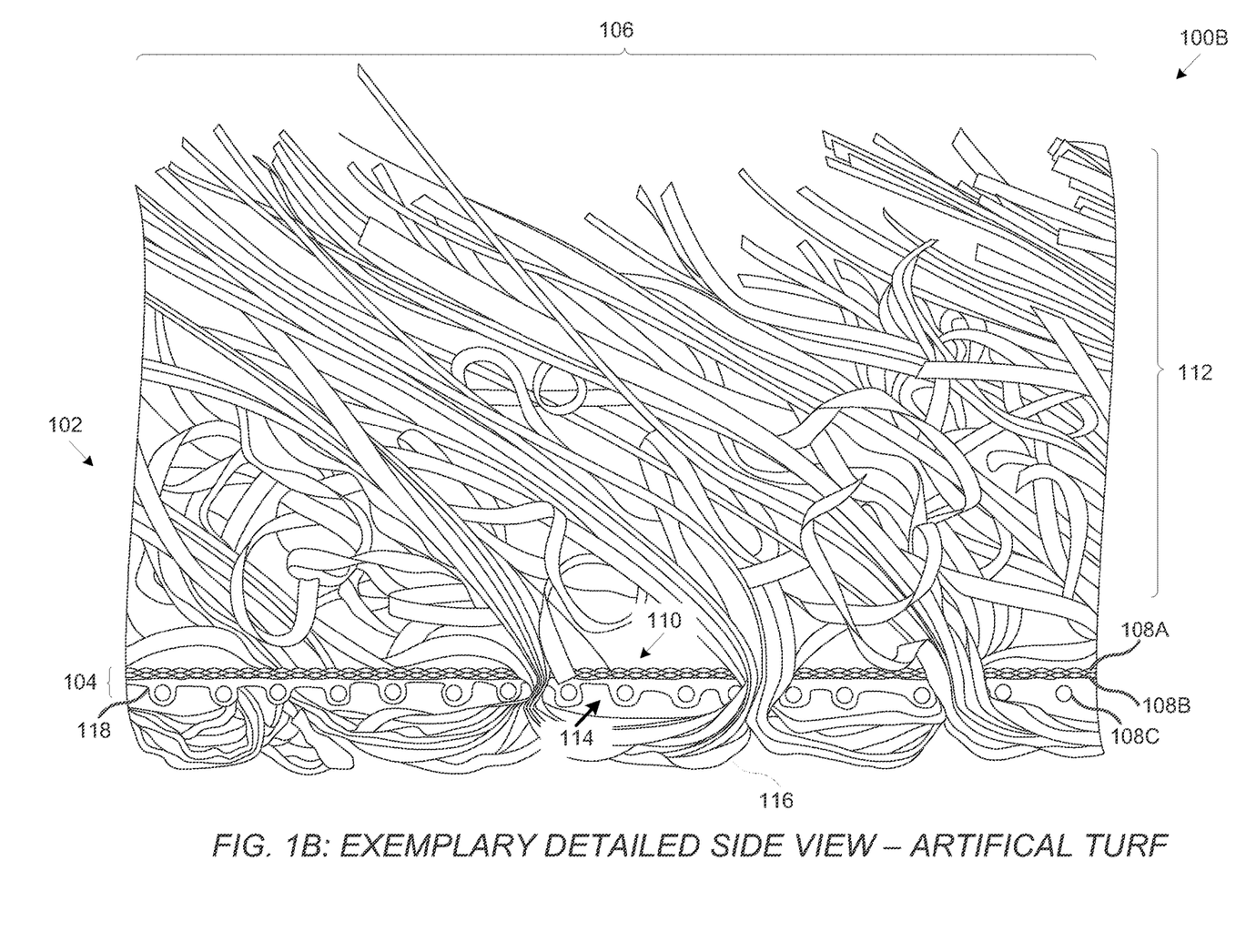

Referring now to the figures, for the purposes of example and explanation of the fundamental processes and components of the disclosed systems and methods of manufacture thereof, reference is made to FIG. 1 (consisting of FIGS. 1A and 1B), which illustrates a side view 100A and 100B of a synthetic grass system 102 (alternatively referred to as a "synthetic turf system," "artificial turf," "artificial turf system," etc.), according to one embodiment of the present disclosure. As will be understood and appreciated, the exemplary synthetic grass system 102 shown in FIG. 1 represents merely one approach or embodiment of the present disclosure, and other aspects are used according to various embodiments of the present disclosure. Generally, FIG. 1A comprises a simplified side view 100A of the synthetic grass system 102, whereas FIG. 1B comprises a detailed side view 100B of the synthetic grass system 102.

In various embodiments, the synthetic grass system 102 comprises a pile fabric having a backing 104 and a plurality of generally upstanding pile elements 106 (e.g., synthetic grass blades, etc.). Generally, the backing 104 comprises a plurality of layers 108A, 108B, and 108C that are affixed to each other (e.g., woven, etc.) in layers one on top of the other to form the backing 104. As will occur to one having ordinary skill in the art, the backing 104 may comprise any number of layers (e.g., 2, 3, 4, 5, 6, etc.) as would be appropriate for the intended application of the synthetic grass system 102. In one non-limiting example, the synthetic grass system 102 generally comprises a triple-layer backing 104 (e.g., two 11-18 pick layers and one 5-8 pick layer, or any other combination of pick counts that permits water to flow through the synthetic grass system 102).

In one embodiment, the plurality of generally upstanding pile elements 106 are tufted through the backing 104 through small holes (as will be understood, although the synthetic grass system 102 is referred to as "non-perforated," it has small holes through which the plurality of generally upstanding pile elements 106 pass but has no additional drainage perforations). Thus, in one embodiment, the synthetic grass system 102 has a top surface 110, comprising the top of the topmost layer 108A of the backing 104 and the portion 112 of the plurality of generally upstanding pile elements 106 extending therethrough, and a lower surface 114, comprising the bottom of the lowermost layer 108C of the backing 104 and pile overlays 116 wherein the plurality of generally upstanding pile elements 106 extending through the backing 104 pass over the lowermost layer 108C between. Generally, when the synthetic grass system 102 is installed, the top surface 110 faces upwards/skywards, and the lower surface 114 rests on the ground/faces downwards.

In various embodiments, the lower surface 114 is coated with an air-injected coating 118 to further bind the plurality of layers 108A, 108B, and 108C and the plurality of generally upstanding pile elements 106 and to permit a drainage rate that will remain consistent throughout the life of the synthetic grass system 102. Generally, the air-injected coating 118 may comprise a polyurethane or urethane blend (e.g., in one non-limiting example, the urethane blend may comprise 29.7% Polyol 1, <1% Polyol 2, <1% Black Dye, <1% Catalyst, 53.3% Filler, and 15.5% Isocyanate). Because an air-injected coating 118 (e.g., high viscosity polyurethane compound, etc.) is applied to the synthetic grass system 102, the synthetic grass system 102 has exceptional drainage capacity without the need for perforations that can clog with infill material. Generally, the air-injected coating 118 is homogeneously spread across the lower surface 114 so that it evenly coats the same. Accordingly, in one embodiment, the relative thinness of the air-injected coating 118 coupled with the air pockets (from the injected air) permits liquids (e.g., water, etc.) to penetrate in and around the tuft bind to flow through the turf. In an alternative embodiment, the air bubbles create small passages through the coating 118 when cured that permit drainage therethrough. In an alternative embodiment, the air bubbles within the coating 118 generally converge on the generally upstanding pile elements 106 as they pass through the backing 104, thereby creating passageways concentric with the tufting holes for the generally upstanding pile elements 106 that permit drainage. In an alternative embodiment, the air-injected coating 118 does not coat the backing 104 underneath the pile overlays 116 formed by the generally upstanding pile elements 106 as they pass over the backing 104 between the tufting holes thereby permitting drainage underneath the pile overlays 116. In an alternative embodiment, the coating 118 is not air-injected but the thinness of the coating 118 permits drainage. In various embodiments, the air-injected coating 118 has an overall combined weight of 11 to 18 ounces per square yard depending on the intended use of the synthetic grass system 102 (e.g., landscaping turf could use less of the coating 118, whereas an athletic field turf could use more of the coating 118).

Still referring to FIG. 1, generally, the synthetic grass system 102 can be installed with the same methods and tools currently being used in the installation of artificial turf. The backing 104 and air-injected coating 118 has no special maintenance requirements or techniques and will generally last the life of the synthetic grass system 102 without losing its initial integrity.

Exemplary drainage properties of artificial turf are provided in Table 1, which illustrate test results of drainage/flow through/water permeability of the disclosed synthetic grass system 102 in comparison to the prior art as collected by an independent third party, Testing Services Inc. of Dalton, GA, using ASTM standards. Generally, the results in Table 1 show that the drainage rate (e.g., water permeability/the amount of rainfall that can flow through the artificial turf in a given period of time) of the synthetic grass system 102 exceeds that of the prior art (e.g., with large drainage holes/perforations). In one embodiment, the results in Table 1 were collected on specimens of 11.5 inches in diameter (e.g., approximately 86 square inches) using a tube with a length of 8 inches, outside diameter of 10.75 inches, and inside diameter of 10 inches, the tube had a flange of 9.375 inches in diameter, an index mark at 6 inches, a flow head of 2 gallons, and a weight of 39 pounds. No conditioning was performed on the artificial turf tested, except for those specimens marked with an "*", which were subject to a 70° F. 65% relative humidity for a minimum of 24 hours.

TABLE 1

Drainage Rates of Artificial Turf, using ASTM F1551 standard

| Artificial Turf Specimen Tested | Average Drainage Rate (Inches/Hour) |
|---|---|
| Exemplary Prior Art (with 3-layer backing, an 8 pick secondary backing, and drainage perforations) | 53.0 |
| Exemplary Prior Art (with 3-layer backing, an 8 pick secondary backing, and drainage perforations)* | 88.0 |
| Synthetic Grass System 102 (with 4-layer backing 104 and an 8 pick secondary backing 108C), without infill | 82.8 |
| Synthetic Grass System 102 (with 3-layer backing 104 and an 8 pick secondary backing 108C), without infill | 104.6 |
| Synthetic Grass System 102 (with 3-layer backing 104 and a 5 pick secondary backing 108C), without infill* | 437.8 |
| Synthetic Grass System 102 (with 3-layer backing 104 and a 5 pick secondary backing 108C), with infill | 167.4 |

Exemplary tuft bind strength properties of artificial turf are provided in Table 2, which illustrate test results of tuft bind strength of the disclosed synthetic grass system 102 in comparison to the prior art as collected by an independent third party, Testing Services Inc. of Dalton, GA, using ASTM standards. Generally, the results in Table 2 show that the tuft bind strength (e.g., at what force the plurality of generally upstanding pile elements 106 are pulled out of the backing 104) of the synthetic grass system 102 exceeds that of the prior art (e.g., with large drainage holes/perforations). In one embodiment, the wet results in Table 2 were collected after soaking the specimens in water at room temperature for 72 hours.

TABLE 2

Tuft Bind Strength of Artificial Turf, using ASTM D1335 standard

| Artificial Turf Specimen Tested | Average Tuft Bind Strength (Pounds/Force) |
|---|---|
| Exemplary Prior Art (with latex-based coating)—Dry | 6.1 |
| Exemplary Prior Art (with latex-based coating)—Wet | 5.1 |
| Synthetic Grass System 102 (with 3-layer backing 104 and a 5 pick secondary backing 108C)—Dry | 9.0 |
| Synthetic Grass System 102 (with 4-layer backing 104 and an 8 pick secondary backing 108C)—Dry | 10.1 |
| Synthetic Grass System 102 (with 3-layer backing 104 and a 5 pick secondary backing 108C)—Wet | 7.6 |

Figure 2:
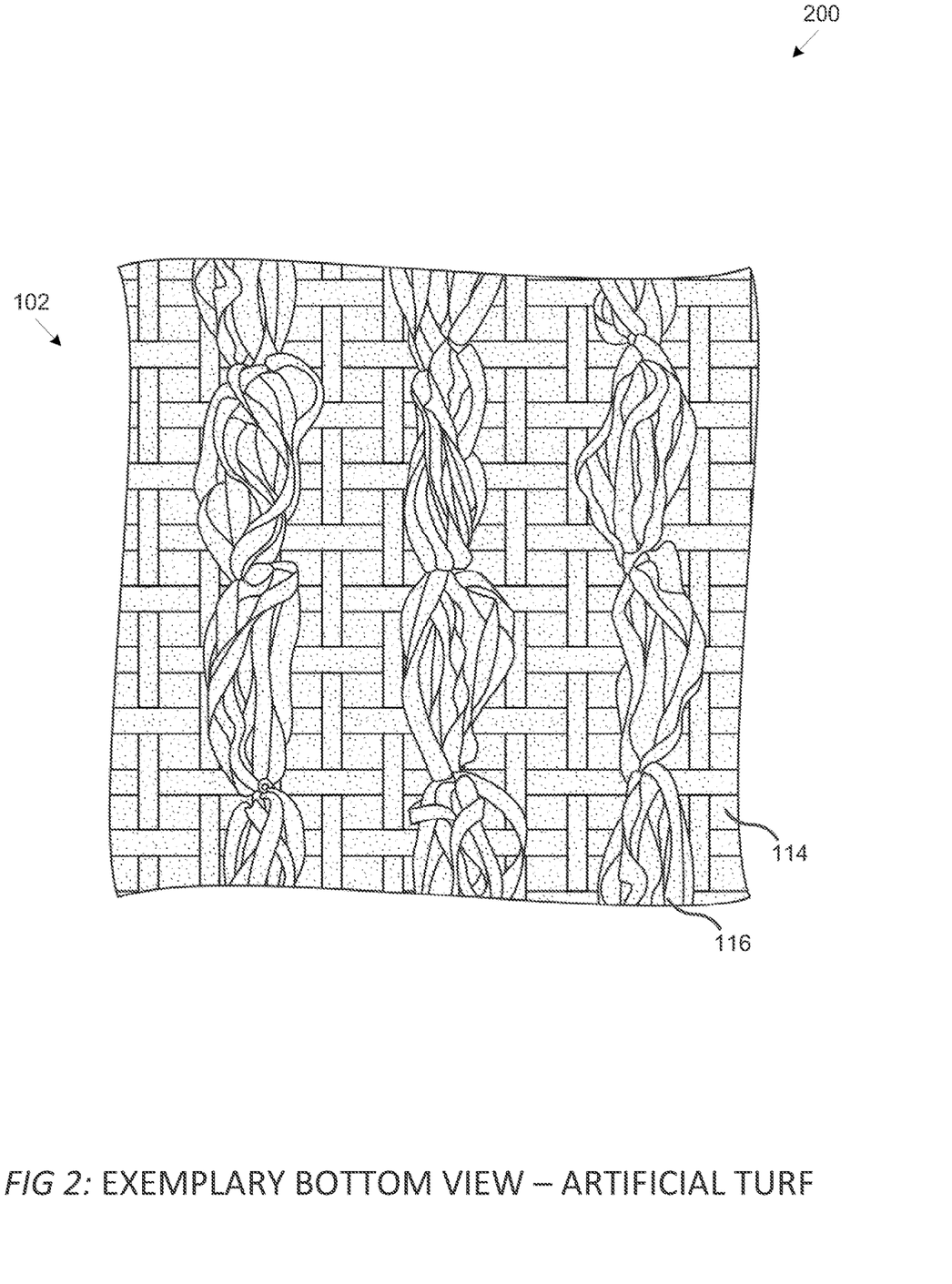
FIG. 2 illustrates a bottom view of a synthetic grass system, according to one embodiment of the present disclosure.

Now referring to FIG. 2, a bottom view 200 of a synthetic grass system 102 is shown according to one embodiment of the present disclosure. Generally, the bottom view 200 shows additional details of a lower surface 114 of the synthetic grass system 102. In various embodiments, the lower surface 114 comprises the bottom of a lowermost layer 108C of a backing 104 and the pile overlays 116 of a plurality of generally upstanding pile elements 106 extending therethrough. In one embodiment, an air-injected coating 118 (in FIG. 2, the air-injected coating 118 is represented by stippling but not marked with reference character "118") is homogeneously spread across the lower surface 114 so that it relatively evenly coats the bottom of the lowermost layer 108C of the backing 104 and the pile overlays 116 of the plurality of generally upstanding pile elements 106 extending therethrough. Generally, as will be understood, as the lower surface 114 is not uniform; thus, in various embodiments, the coating 118 may be spread homogeneously across the lower surface 114, but in certain places, it may not be of the same thickness as in other places on the lower surface 114 due to the variations of the lower surface 114.

Figure 3:
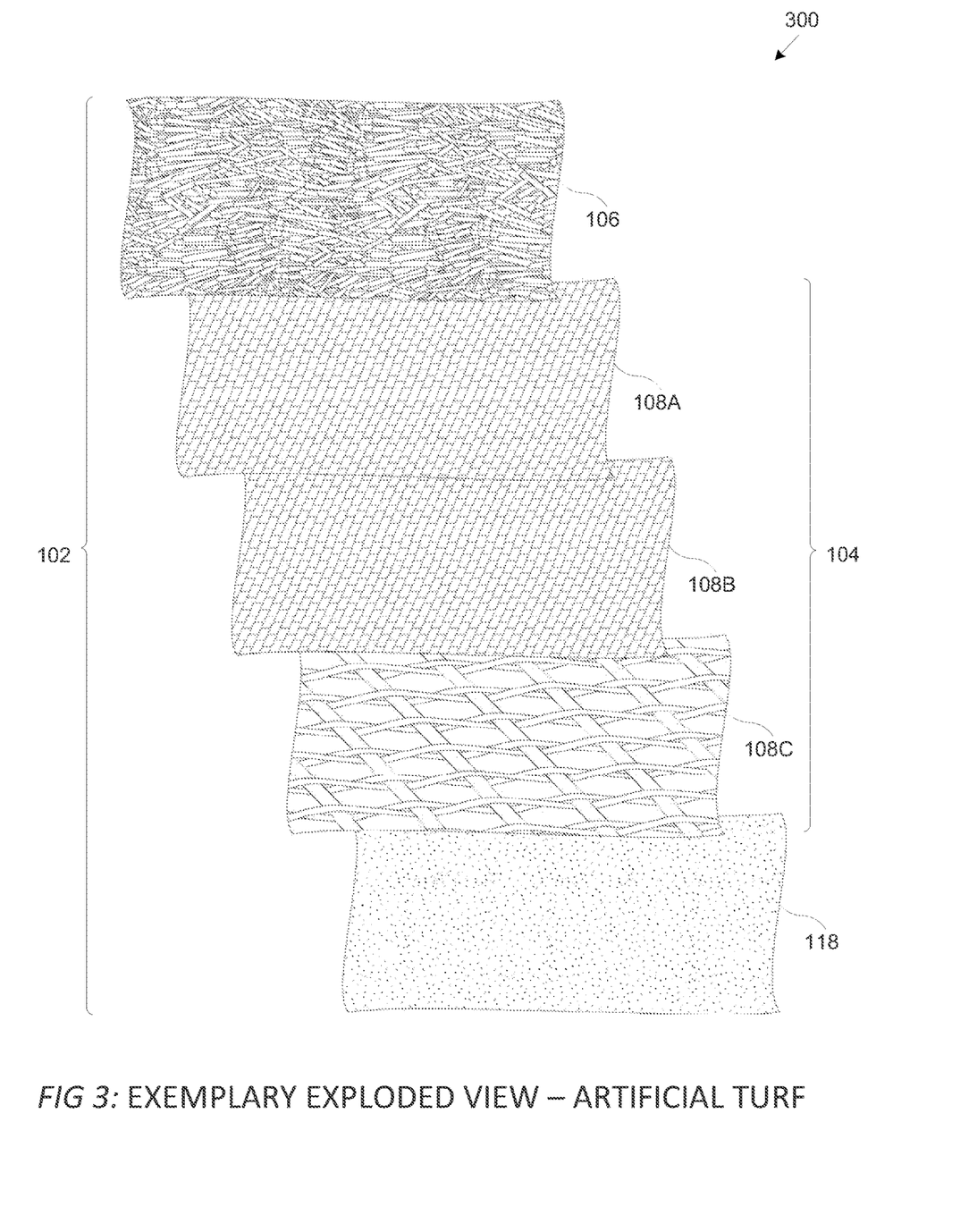
FIG. 3 illustrates an exploded view of a synthetic grass system, according to one embodiment of the present disclosure.

Referring now to FIG. 3, an exploded view 300 of a synthetic grass system 102 is shown according to one embodiment of the present disclosure. Generally, the number of elements (e.g., backing 104, the plurality of generally upstanding pile elements 106, and coating 118, etc.), orientation of those elements, and composition of those elements as shown in FIG. 3 are for exemplary purposes only. As will be understood by one having ordinary skill in the art, the backing 104 may have any number of layers 108A, 108B, and 108C comprising different properties as would be necessary for the intended use of the synthetic grass system 102 (e.g., landscaping turf could use a backing 104 with as few as two layers, whereas an athletic field turf could use a backing 104 with four layers).

In various embodiments, the synthetic grass system 102 comprises a backing 104 and a plurality of generally upstanding pile elements 106 (e.g., synthetic grass blades, etc.). Generally, the backing 104 comprises a plurality of layers 108A, 108B, and 108C that are affixed to each other (e.g., woven, etc.) in layers one on top of the other to form the backing 104. As will occur to one having ordinary skill in the art, the backing 104 may comprise any number of layers (e.g., 2, 3, 4, 5, 6, etc.) as would be appropriate for the intended application of the synthetic grass system 102. In one embodiment, the plurality of generally upstanding pile elements 106 are tufted through the backing 104 (e.g., layers 108A, 108B, and 108C). In various embodiments, the lower surface 114 is coated with an air-injected coating 118 to further bind the backing 104 and the plurality of generally upstanding pile elements 106 and to permit a drainage rate that will remain consistent throughout the life of the synthetic grass system 102.

Exemplary, non-limiting properties of the layers 108A, 108B, and 108C, according to one embodiment of the present disclosure are shown in Table 3. In various embodiments, the layers 108A and 108B (alternatively referred to as "primary backing") may comprise the same tightly-woven polypropylene material with a puncture resistance of 90 pounds per square inch, grab strength of 190 lbs/5 cm by 120 lbs/5 cm, and elongation of 27% by 15%. In one embodiment, the layer 108C (alternatively referred to as "secondary backing") may be a less tightly-woven polypropylene material that is different from the material used in the other layers 108A and 108B.

TABLE 3

Exemplary Layer Properties

| Layer Property | Layer 108A | Layer 108B | Layer 108C |
|---|---|---|---|
| Weight | 121 g/m$^2$ | 121 g/m$^2$ | 1.63 oz/yd$^2$ |
| Construction | 29 picks/inch by 13 picks/inch | 29 picks/inch by 13 picks/inch | 15 picks/inch by 5 picks/inch |
| Color | Black | Black | White |
| Width | 4.74 m | 4.74 m | 190 inches |
| Selvedge | Sulzer | Sulzer | Tuck-In |

Generally, infill material (e.g., sand, rubber, resilient particles, etc.) may be placed on the top surface 110 of the synthetic grass system 102 during installation to stabilize the same (not shown in FIG. 3). Similarly, an additional layer (e.g., non-woven scrim weighing between 1.4 oz/yd$^2$ and 2.5 oz/yd$^2$ that is made of polypropylene or polyester) may be inserted between the layers 108A and 108B to further support the synthetic grass system 102.

Figure 4:
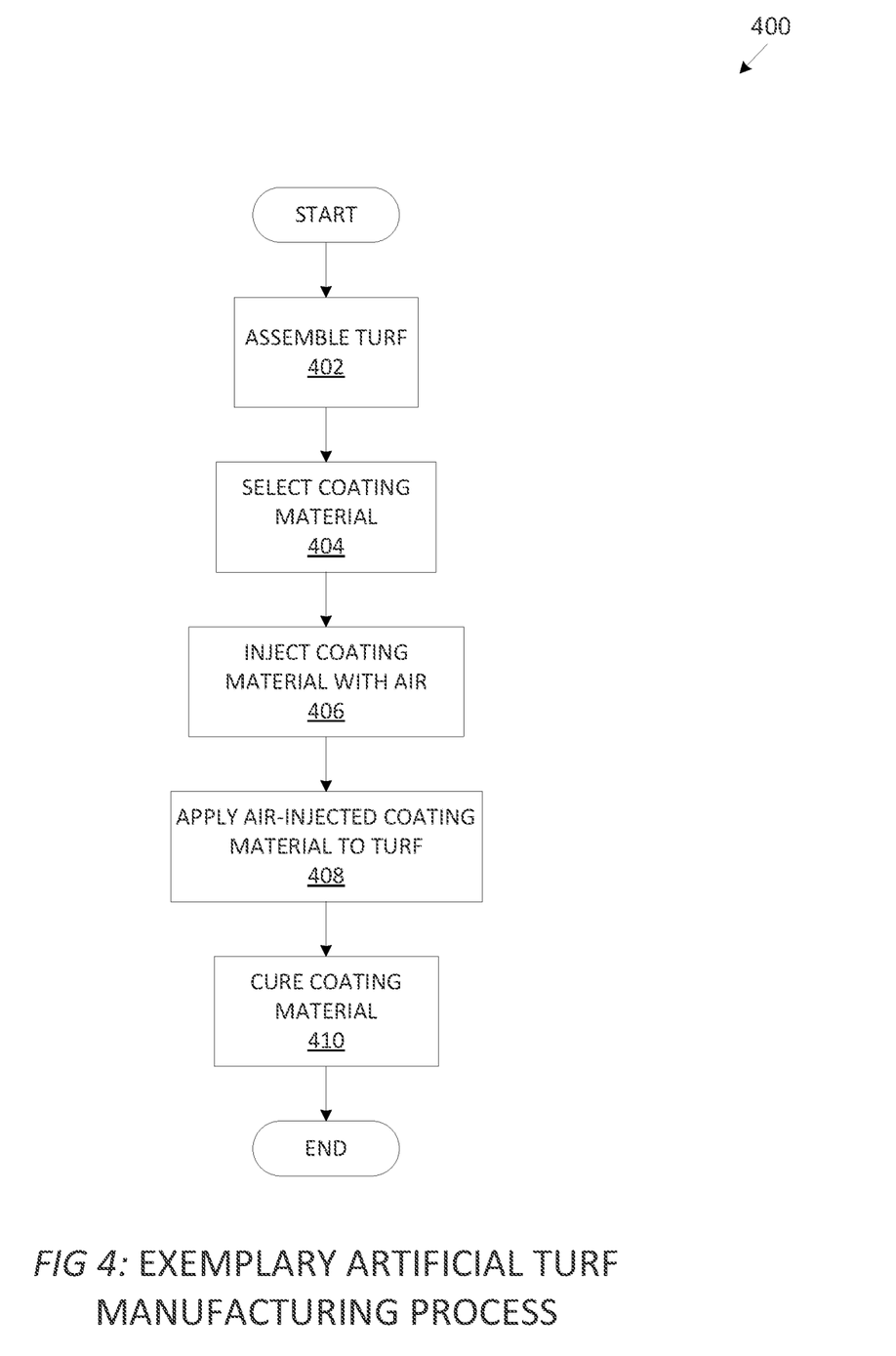
FIG. 4 is a flowchart showing an exemplary synthetic grass system manufacturing process, according to one embodiment of the present disclosure.

Now referring to FIG. 4, an exemplary synthetic grass system manufacturing process 400 is shown according to one embodiment of the present disclosure. Generally, manufacturing process 400 is the process by which a synthetic grass system 102, as disclosed herein, is manufactured. As will be understood by one having ordinary skill in the art, the steps and processes shown in FIG. 4 (and those of all other flowcharts and sequence diagrams shown and described herein) may operate concurrently and continuously, are generally asynchronous and independent, and are not necessarily performed in the order shown.

In various embodiments, the air-injected coating alters the standard manufacturing process of artificial turf by permitting faster coating speeds of the backing on the turf, thereby reducing the overall manufacturing time of the artificial grass systems. Thus, at step 402, in various embodiments, the turf is assembled (e.g., the layers 108A, 108B, and 108C are woven together to form the backing 104 and the plurality of generally upstanding pile elements 106 are tufted through the backing 104) or preassembled turf is gathered for application of the air-inject coating. Generally, at step 404, the coating material is selected (e.g., a particular formulation of urethane depending on the intended use of the synthetic grass system 102).

At step 406, in various embodiments, the coating material is injected with air, which creates passages in the coating material once it is applied to the turf that allow for free flow drainage through the synthetic grass system 102. In one embodiment, the amount of air injected into the polyurethane compound is controlled through use of a regulator that permits from approximately 60 actual cubic feet per minute (ACFM, calculated using the pressure of the injected air at the regulator and the diameter of the hose transporting the air) to approximately 130 ACFM of air to be injected into the coating material, depending on the line speed of the oven (preferably between 100-130 ACFM). Generally, the higher the speed of the oven, the higher the ACFM. Regardless of the ACFM rate during manufacturing, in one embodiment, an air pressure leaving the regulator should be maintained between 100 and 150 psi (preferably, approximately 120 psi), which provides for sufficient air in the coating material to achieve optimal drainage.

In one embodiment, at step 408, the air-injected coating material is applied to the lower surface 114 with the use of a small delivery hose (e.g., 1 inch in diameter). In one embodiment, the hose traverses from side to side across the turf while a floating bar applicator or roller-type applicator forces the air-injected coating material deep into and spreads the air-injected coating material evenly across the lower surface 114 and scrapes the excess the air-injected coating material away from the lower surface 114. Generally, the viscosity of the air-injected coating material ensures that it uniformly coats the lower surface 114 without completely sealing the same.

Once the air-injected coating material has been applied to the turf, in various embodiments, at step 410, the coating material is cured (e.g., dried, heated, etc.). In one embodiment, a steam heat oven is used to accelerate the curing process while the backing and turf are kept at a temperature between about 150° F. and 300° F. Generally, the oven may be of any type (e.g., steam, gas, etc.) as long as it is of sufficient length to allow complete curing of the urethane for a given line/manufacturing speed (e.g., a 100 foot oven held at less than 220° F. at a speed wherein the turf spends approximately 5 minutes within the oven). Once the air-injected coating material has been cured, then the manufacturing process 400 is complete and the synthetic grass system 102 is ready to be installed.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. An artificial turf, comprising:
   a backing comprising a first side and a second side;
   a plurality of generally upstanding synthetic grass blades, wherein the plurality of generally upstanding synthetic grass blades extend across the first side to form a plurality of pile overlays, extend through the backing, and terminate outside the backing proximate the second side; and
   an air-injected coating that coats the first side of the backing and the plurality of pile overlays to bind together the backing and the plurality of generally upstanding synthetic grass blades;
   wherein the air-injected coating permits a flow of liquids through the artificial turf; such that the flow of water through 86 square inches of the artificial turf exceeds 55 inches per hour.

2. The artificial turf of claim 1, wherein the air-injected coating uniformly coats the first side of the backing and the plurality of pile overlays.

3. The artificial turf of claim 1, further comprising a layer of infill particles resting on the second side between the plurality of generally upstanding synthetic grass blades.

4. The artificial turf of claim 1, wherein the flow of water through 86 square inches of the artificial turf exceeds 80 inches per hour.

5. The artificial turf of claim 1, wherein the air-injected coating comprises a thickness that binds together the backing and the plurality of generally upstanding synthetic grass blades with an average tuft bind strength that exceeds 6.5 pounds per force.

6. The artificial turf of claim 1, wherein the air-injected coating comprises urethane.

7. The artificial turf of claim 1, wherein the backing comprises a plurality of layers.

8. An artificial turf, comprising:
a backing comprising a first side and a second side;
a plurality of generally upstanding synthetic grass blades, wherein the plurality of generally upstanding synthetic grass blades extend across the first side to form a plurality of pile overlays, extend through the backing, and terminate outside the backing proximate the second side; and
a coating that substantially coats the first side of the backing and the plurality of pile overlays to bind together the backing and the plurality of generally upstanding synthetic grass blades, wherein the coating comprises a plurality of air pockets formed from injected air; and
wherein the plurality of air pockets form passageways through the coating that permit a flow of liquids through the artificial turf, such that the flow of water through 86 square inches of the artificial turf exceeds 55 inches per hour.

9. The artificial turf of claim 8, wherein the coating comprises a urethane or polyurethane.

10. The artificial turf of claim 8, wherein the plurality of generally upstanding synthetic grass blades extend through the backing via a plurality of tufting holes.

11. The artificial turf of claim 8, wherein the coating has a thickness less than a thickness of the backing.

12. The artificial turf of claim 8, wherein the coating has an overall combined weight of 11 to 18 ounces per square yard.

13. The artificial turf of claim 8, wherein the coating is homogeneously spread across the first side.

14. The artificial turf of claim 8, wherein the coating does not cover the backing underneath the pile overlays.

15. The artificial turf of claim 8, wherein the backing is non-perforated.

16. The artificial turf of claim 1, wherein the backing is non-perforated.

* * * * *